United States Patent [19]
Zanoni

[11] Patent Number: 4,979,600
[45] Date of Patent: Dec. 25, 1990

[54] RETAINING CLIP FOR A ONE-WAY SPRAG CLUTCH

[75] Inventor: Stephen J. Zanoni, Westchester, Ill.

[73] Assignee: Borg-Warner Automotive, Inc., Sterling Heights, Mich.

[21] Appl. No.: 459,860

[22] Filed: Jan. 2, 1990

[51] Int. Cl.⁵ ............................................. F16D 41/07
[52] U.S. Cl. .................................. 192/41 A; 192/45.1
[58] Field of Search ........................ 192/41 A, 45.1, 45

[56] References Cited

U.S. PATENT DOCUMENTS

| 2,837,188 | 6/1958 | Cobb | 192/45.1 |
| 2,912,086 | 11/1959 | Troendly et al. | 192/45.1 |
| 2,940,568 | 6/1960 | Fagiano | 192/45.1 |
| 2,966,246 | 12/1960 | Dodge | 192/45.1 |
| 4,619,352 | 10/1986 | Shoji et al. | 192/41 A |
| 4,771,873 | 9/1988 | Kinoshita et al. | 192/41 A |

FOREIGN PATENT DOCUMENTS

| 2813031 | 10/1978 | Fed. Rep. of Germany | 192/45 |
| 0180731 | 7/1988 | Japan | 192/41 A |
| 2190440 | 11/1987 | United Kingdom | 192/41 A |

Primary Examiner—Rodney H. Bonck
Attorney, Agent, or Firm—James A. Geppert; Greg Dziegielewski

[57] ABSTRACT

A one-way sprag clutch for use between inner and outer races wherein the sprag clutch includes an inner cage, an outer cage, an energizing spring located between the two cages, both cages and energizing spring having aligned openings receiving suitable sprags adapted to engage the interior and exterior surfaces of the outer and inner races, respectively. The outer cage is provided with one or more retaining clips, formed of a suitable resilient metallic or plastic material, circumferentially spaced around the cage; each clip having at least one downwardly and rearwardly bent tab engaging an edge of the outer race and an upwardly inclined lip which is received in an annular groove formed in the interior surface of the outer race to prevent axial movement of the clutch relative to the races. In one embodiment, the retaining clip is generally rectangular and provided with a pair of downwardly extending tabs engaging opposite edges of the outer cage, one of the tabs also being rearwardly extending; while in a second embodiment, the retaining clip is generally U-shaped with only one downward tab and parallel legs terminating in upwardly bent lips engaging the groove. This embodiment also has raised central portions of the legs which frictionally engage the interior surface of the outer race.

5 Claims, 2 Drawing Sheets

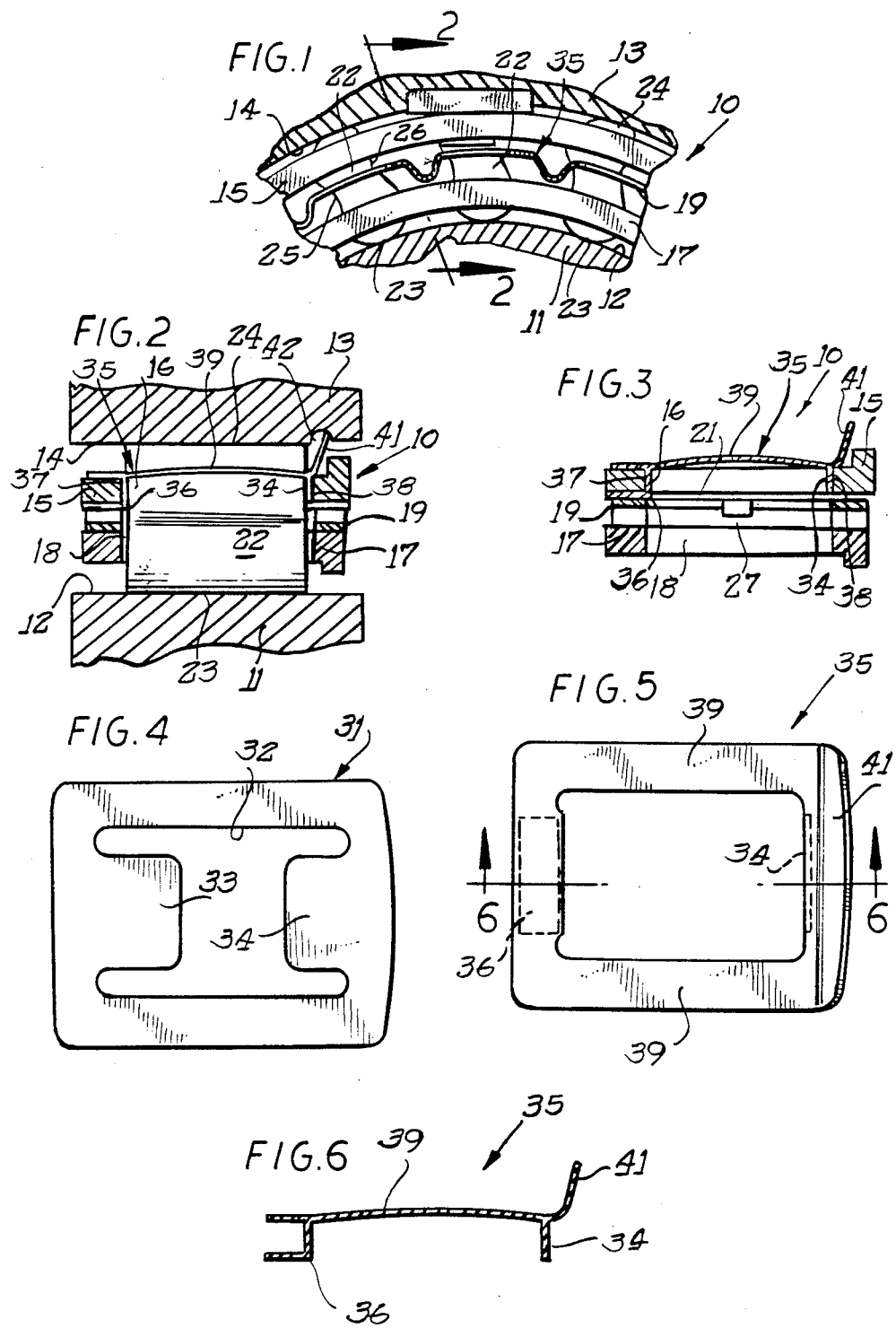

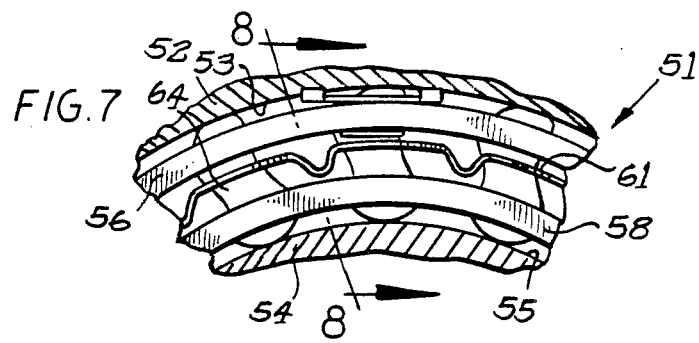
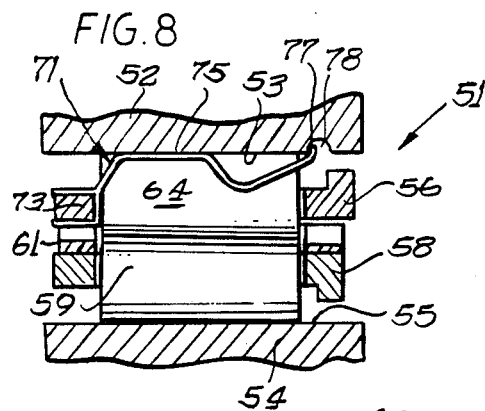
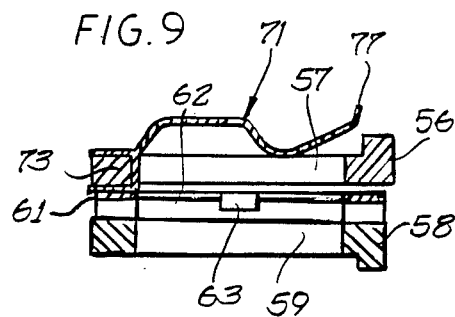
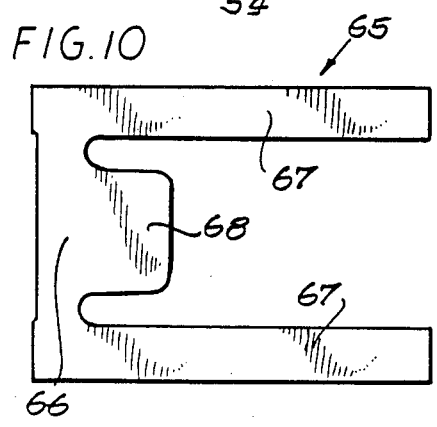
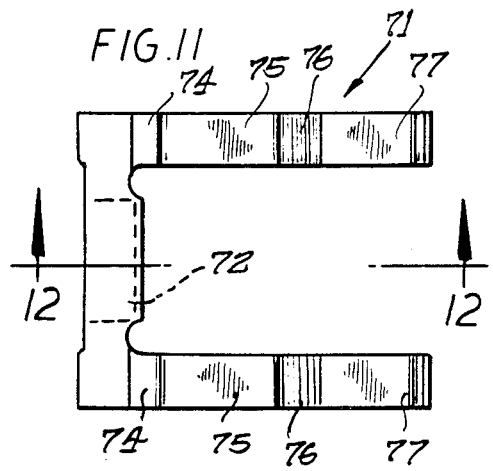
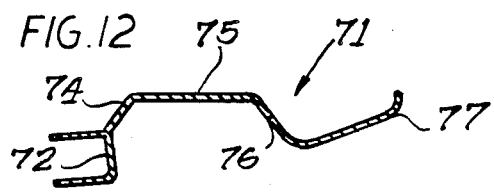

RETAINING CLIP FOR A ONE-WAY SPRAG CLUTCH

TECHNICAL FIELD

The invention disclosed herein relates to a retainer clip for a one-way sprag clutch wherein one or more circumferentially spaced clips are used to axially position the sprag clutch assembly between the inner and outer races for the clutch; each clip having at least one tab which fits into a groove formed in the outer race to prevent axial movement of the clutch assembly relative to the races.

BACKGROUND

A sprag clutch is located between the inner and outer races for a one-way overrunning clutch assembly has a plurality of sprags that are positioned in the clutch by generally aligned openings formed in inner and outer cages providing the enclosure for the sprags. The sprag clutch assembly conventionally includes an outer annular cage, an inner annular cage, an annular energizing spring located between the two cages, and a plurality of sprags which are positioned within the cages and energizing spring in the generally radially aligned openings in the cages and spring.

The sprags are generally circumferentially equally spaced around the clutch structure with the energizing spring having spring arms or tabs which engage each sprag intermediate its ends to normally bias the sprags into engagement with the inner surface of the outer race and the outer surface of the inner race. To locate the clutch assembly between the races and prevent the assembly from shifting axially within the races, snap rings are provided in annular grooves formed in the inner surface of the outer race and the outer surface of the inner race; the snap rings and grooves requiring additional space in the clutch assembly between the races. The present invention overcomes the space problems and provides a new and novel method of positioning the clutch assembly between the races.

DISCLOSURE OF THE INVENTION

This invention relates to a retainer clip of a configuration that is attached to the outer cage of the one-way clutch assembly and engages an annular groove in the inner surface of the outer race so as to prevent any undesirable axial movement of the clutch assembly and positively retain the clutch assembly in proper operative position between the races without adding to the space requirements of the assembly. The retaining clips are each formed of suitable resilient material and are positively engaged with the outer clutch cage.

BRIEF DESCRIPTION OF DRAWINGS

FIG. 1 is a partial side elevational view, with portions in cross section, of a one-way clutch assembly and races with a retaining clip of the present invention positioned on the outer cage.

FIG. 2 is a partial cross sectional view of the races and clutch assembly taken on the line 2—2 of FIG. 1 with the clip shown in elevation.

FIG. 3 is a partial cross sectional view of the clutch assembly with the clip shown in cross section and the sprags and inner and outer races omitted.

FIG. 4 is a top plan view of a blank used to form the embodiment of retainer clip shown in FIG. 1.

FIG. 5 is a top plan view of the retainer clip formed from the blank of FIG. 4

FIG. 6 is a cross sectional view of the retainer clip taken on the line 6—6 of FIG. 5.

FIG. 7 is a partial side elevational view, with portions in cross section, of a clutch assembly and races showing a second embodiment of retainer clip.

FIG. 8 is a partial cross sectional view of the clutch assembly taken on the line 8—8 of FIG. 7 with the clip shown in elevation.

FIG. 9 is a partial cross sectional view of the clutch assembly of FIG. 8 with the clip shown in cross section and the sprags and races omitted.

FIG. 10 is a top plan view of a second embodiment of blank to form the embodiment of retainer clip shown in FIG. 7.

FIG. 11 is a top plan view of the second embodiment of retainer clip formed from the blank of FIG. 10.

FIG. 12 is a cross sectional view of the retainer clip taken on the line 12—12 of FIG. 11.

BEST MODES OF CARRYING OUT THE INVENTION

Referring more particularly to the disclosure in the drawings wherein are shown illustrative embodiments of the present invention, FIGS. 1 and 2 disclose a portion of a one-way clutch of the sprag type which is positioned between an inner race 11 and an outer race 13 located in an automatic transmission for an automotive vehicle or similar application, wherein the clutch assembly includes an annular outer cage 15, an annular inner cage 17, a generally annular energizing spring 19, and a plurality of sprags 22 which are generally circumferentially equally spaced about the clutch assembly. Each sprag is formed with opposite curved ends or wedging surfaces 23 and 24 adapted to engage the exterior surface 12 of the inner race 11 and the interior surface 14 of the outer race 13, respectively.

The outer cage 15 has a plurality of openings 16 (FIG. 3) to receive the outer ends 24 of the sprags; the inner cage 17 has a plurality of openings 18 (FIG. 3) to receive the inner ends 23 of the sprags, and the energizing spring 19 has openings 21 (FIG. 3); all openings 16, 18 and 21 being generally radially aligned in the clutch. Conventionally the sprag body is notched at 25 and 26 (FIG. 1) on the opposite sides thereof with the energizing spring 19 having one or more spring tabs 27 extending into each opening 21 in the spring to engage the notched surfaces on the sides of the respective sprag and act to bias the sprag into engaged position against the surfaces of the inner and outer races.

FIG. 4 discloses a blank 31 which is stamped out of a resilient strip material, such as a spring steel or plastic, for the formation of the retainer clip 35. The blank is of a generally rectangular shape with a central opening 32 having tabs 33 and 34 extending inwardly from the opposite ends of the blank. The tab 33 is slightly longer than the tab 34 due to the final shape of the clip 35. As seen in FIGS. 5 and 6, the blank is formed into the clip 35 by bending the tab 33 downwardly and rearwardly to form a C-shaped anchor 36 that is slipped over the edge 37 of the cage 15 at the opening 16, and the tab 34 is bent downwardly at right angles to the body of the clip so as to engage the opposite edge 38 of the cage defining opening 16. The blank 31 is formed with bowed sides 39 and an upturned lip 41 adjacent the tab 34 bent to be inclined upwardly so as to engage and snap into an annular groove 42 formed in the interior surface 14 of the outer race 13. The use of one or more spring clips 35 instead of the snap rings which usually are received in axially spaced annular grooves formed in both the inner and outer races for the clutch reduces the overall dimensions of the clutch. Although only one clip is used in FIGS. 1 and 2, three circumferentially equally spaced retainer clips are preferably utilized in the one-way clutch assembly.

FIGS. 7 through 9 disclose a second embodiment of retainer clip 71 utilized in a one-way sprag clutch assembly 51 which has substantially the same structure as the assembly of FIGS. 1 through 3. This assembly 51 includes an outer race 52 having an interior cylindrical surface 53, an inner race 54 having an exterior cylindrical surface 55, and the one-way clutch including an outer cage 56 with circumferentially spaced openings 57, an inner cage 58 with openings 59 generally radially aligned with the openings 57, and a generally annular energizing spring 61 having openings 62 aligned with the openings 57, 59 in the cages; each spring opening 62 having at least one energizing tab 63 extending into the opening to contact a sprag 64 positioned in the aligned opening for engagement with the surfaces of the inner and outer cages.

FIG. 10 discloses the blank 65 stamped from sheet metal which is formed to become the retainer clip 71. This blank is a flat, generally U-shaped member having a base 66, a pair of parallel legs 67, 67, and an inwardly extending tab 68 projecting from the base 66 between the legs. The clip 71 is formed from the blank with the tab 68 being bent downwardly and rearwardly to form a C-shaped anchor portion 72 that is slipped over an edge 73 of the outer cage 56 defining an opening 57 therein. The major portion of each leg is bent to form an inclined portion 74, an elongated raised portion 75 and an oppositely inclined portion 76; the legs terminating in upwardly bent lips 77 that engage in an annular groove 78 formed in the interior surface 53 of the outer race 52 to retain the clutch structure between the races.

As seen in FIG. 8, the raised portion 75 has an interference fit with the interior surface 53 of the outer race 52 which provides a friction bias against relative rotation between the outer cage 56 and the outer race 52 in addition to the axial retention of the clutch. The nature of the retaining clip requires that it be made of a resilient spring-type material, such as a suitable metal or plastic. For most one-way clutch applications, stainless steel is the material of choice.

INDUSTRIAL APPLICABILITY

The invention described herein is readily applicable for use in automotive automatic transmissions, aircraft or any other place where one-way clutches are currently used.

I claim:

1. In a one-way sprag clutch positioned between an inner race and a concentric outer race having an interior cylindrical surface and which includes an outer cage having an outer cylindrical surface, an inner cage and an energizing spring located therebetween, each cage and energizing spring having a plurality of generally radially aligned openings receiving a plurality of sprags therein, the improvement comprising at least one spring retaining clip positioned on the outer surface of the outer cage, the retaining clip including a generally rectangular body having opposite ends and parallel sides defining a central opening having inner edges, a radially inwardly and axially rearwardly bent tab to partially encompass a portion of one end of the outer cage, and a second spaced radially inwardly bent tab adjacent the opposite end of the clip, said tabs being located at the inner edges of the opposite ends, and a radially outwardly bent lip adapted to be received in an annular groove formed in the interior surface of the outer race.

2. A one-way sprag clutch as set forth in claim 1, wherein the parallel sides of the clip are outwardly bowed between the opposite ends, with the end of the clip opposite the inwardly and rearwardly bent tab bent radially outwardly to form the lip engaging said groove.

3. A one-way sprag clutch as set forth in claim 2, wherein the tabs engage the edges of openings in the outer cage, and said outwardly bent lip prevents axial movement of the clutch relative to the races.

4. In a one-way sprag clutch positioned between an inner race and an outer race having an interior cylindrical surface, including an outer cage having an outer cylindrical surface, an inner cage and an energizing spring located therebetween, each cage and energizing spring having a plurality of generally radially aligned openings receiving a plurality of sprags therein, the improvement comprising at least one generally U-shaped spring retaining clip positioned on the outer surface of the outer cage, said clip including a base having an inner edge and a pair of parallel legs, a radially inwardly and axially rearwardly bent tab formed on the inner edge of said base, said parallel legs each having a raised central portion adapted to frictionally engage the interior surface of the outer race and terminating at their free ends in generally radially outwardly bent lips received in an annular groove formed in the interior surface of said outer race.

5. A one-way sprag clutch as set forth in claim 4, wherein the parallel legs have the raised portions connected to the base and bent lips through outwardly inclined portions.

* * * * *